United States Patent
Noh et al.

(10) Patent No.: US 10,707,480 B2
(45) Date of Patent: Jul. 7, 2020

(54) POSITIVE ELECTRODE ACTIVE MATERIAL FOR LITHIUM SECONDARY BATTERY

(71) Applicant: IUCF-HYU (INDUSTRY-UNIVERSITY COOPERATION FOUNDATION HANYANG UNIVERSITY), Seoul (KR)

(72) Inventors: Hyung-Joo Noh, Bucheon-si (KR); Yang-Kook Sun, Seoul (KR); Sung-June Youn, Busan (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 652 days.

(21) Appl. No.: 14/926,821

(22) Filed: Oct. 29, 2015

(65) Prior Publication Data
US 2016/0049649 A1 Feb. 18, 2016

Related U.S. Application Data

(63) Continuation of application No. PCT/KR2014/003810, filed on Apr. 29, 2014.

(30) Foreign Application Priority Data

Apr. 29, 2013 (KR) .......... 10-2013-0047797
Apr. 29, 2014 (KR) .......... 10-2014-0051395

(51) Int. Cl.
*H01M 4/38* (2006.01)
*H01M 4/36* (2006.01)
(Continued)

(52) U.S. Cl.
CPC .......... *H01M 4/366* (2013.01); *C01G 53/006* (2013.01); *C01G 53/50* (2013.01); *H01M 4/131* (2013.01); *H01M 4/134* (2013.01); *H01M 4/38* (2013.01); *H01M 4/505* (2013.01); *H01M 4/525* (2013.01); *H01M 10/052* (2013.01); *H01M 10/0525* (2013.01); *C01P 2002/85* (2013.01);
(Continued)

(58) Field of Classification Search
None
See application file for complete search history.

(56) References Cited

PUBLICATIONS

Paulsen et al., Core-Shell Cathode Material with Size-Dependent Composition, 2007, Electrochemical and Solid-State Letters, 10 (4), A101-A105 (Year: 2007).*

* cited by examiner

*Primary Examiner* — Haixia Zhang
(74) *Attorney, Agent, or Firm* — Sughrue Mion, PLLC (57) ABSTRACT

The inventive concepts relate to a positive electrode active material for lithium secondary battery, and more particularly, relate to a positive electrode active material which includes a first concentration gradient portion, a second concentration gradient portion, and a first concentration maintained portion. The first and second concentration gradient portions have gradients of concentrations of nickel, manganese, and cobalt in the direction from the center to the surface, and the first concentration maintained portion has constant concentrations of nickel, manganese, and cobalt between the first concentration gradient portion and the second concentration gradient portion.

8 Claims, 8 Drawing Sheets

(51) Int. Cl.
  *H01M 4/505*      (2010.01)
  *H01M 4/525*      (2010.01)
  *H01M 10/052*     (2010.01)
  *C01G 53/00*      (2006.01)
  *H01M 4/131*      (2010.01)
  *H01M 4/134*      (2010.01)
  *H01M 10/0525*    (2010.01)
  *H01M 10/30*          (2006.01)
  *H01M 4/02*           (2006.01)

(52) U.S. Cl.
  CPC ...... *C01P 2002/88* (2013.01); *C01P 2004/84* (2013.01); *H01M 10/30* (2013.01); *H01M 2004/027* (2013.01); *H01M 2004/028* (2013.01); *Y02T 10/7011* (2013.01)

POSITIVE ELECTRODE ACTIVE MATERIAL FOR LITHIUM SECONDARY BATTERY

CROSS-REFERENCE TO RELATED APPLICATIONS

This application is a continuation of International Application No. PCT/KR2014/003810 filed on Apr. 29, 2014, which claims priority from Korean Patent Application Nos. 10-2013-0047797 filed Apr. 29, 2013 and 10-2014-0051395 filed Apr. 29, 2014, the entire contents of each of which are incorporated herein by reference.

BACKGROUND

1. Field of Disclosure

Embodiments of the inventive concepts described herein relate to a positive electrode active material for lithium secondary battery, and more particularly, relate to a positive electrode active material for lithium secondary battery which includes a first concentration gradient portion, a second concentration gradient portion, and a first concentration maintained portion. The first and second concentration gradient portions have gradients of concentrations of nickel, manganese, and cobalt in the direction from the center to the surface, and the first concentration maintained portion has constant concentrations of nickel, manganese, and cobalt between the first concentration gradient portion and the second concentration gradient portion.

2. Description of the Related Art

A lithium secondary battery has an operating voltage of 3.7 V or more, and the demand for the lithium secondary battery as a power source for driving portable electronic information and communication devices is increasing day by day since the energy density per unit weight thereof is higher than a nickel-cadmium battery or a nickel-hydrogen battery.

In recent years, the study to hybridize an internal combustion engine and a lithium secondary battery as a power source for an electric vehicle has been actively carried out in US, Japan, Europe, and the like. A battery for plug-in hybrid (PHEV) used in a vehicle which has a travel distance of less than 60 miles a day is actively developed mainly in US. The battery for PHEV is a battery which has characteristics close to an electric vehicle, and thus it is a great task to develop a battery having a high capacity. In particular, it is the most important task to develop a positive electrode material which has a high tap density of 2.0 g/cc or more and a high capacity of 230 mAh/g or more.

The positive electrode material which has been currently commercialized or is being developed includes $LiCoO_2$, $LiNiO_2$, $LiMnO_2$, $LiMn_2O_4$, $Li_{1+x}[Mn_{2-x}M_x]O_4$, $LiFePO_4$, and the like. Among these, $LiCoO_2$ is an excellent material which has stable charge and discharge characteristics, excellent electron conductivity, a high battery voltage, high stability, and flat discharge voltage characteristics. However, Co is expensive and toxic to a human body and its reserves is little, and thus the development of another positive electrode material is desired. Moreover, the thermal characteristics of $LiCoO_2$ are significantly poor since its crystal structure is unstable due to delithiation during charge.

To improve this, it is attempted that the start temperature of heat generation is shifted to a higher temperature side by substituting some of Ni with transition metal elements or the exothermic peak is made broad so as to prevent a rapid heat generation. However, satisfactory results have not yet been obtained. In other words, the material $LiNi_{1-x}Co_xO_2$ (x=0.1-0.3) obtained by substituting some of Ni with Co exhibits excellent charge and discharge characteristics and lifespan characteristics but the problem of thermal stability has not yet been solved. In addition, in European Patent No. 0872450, the material $Li_aCo_bMn_cM_dNi_{1-(b+c+d)}O_2$ (M=B, Al, Si. Fe, Cr, Cu, Zn, W, Ti, Ga) obtained by substituting some of Ni with other metals as well as Co and Mn is disclosed, but the thermal stability of the Ni-based material has not yet been solved.

To overcome such a disadvantage, a lithium transition metal oxide which has a concentration gradient of the metal composition has been proposed in Korea Patent Publication No. 2005-0083869. In this method, a material is produced in a double layer by once synthesizing an inner material having a certain composition and then covering it with a material having a different composition and then mixed with a lithium salt, and the mixture is subjected to the heat treatment. A commercially available lithium transition metal oxide may be used as the inner material.

In this method, however, the metal composition of the positive electrode active material discontinuously changes between the inner material and the outer material thus produced but not continuously and gradually changes. Moreover, the powder synthesized by this invention has a low tap density since ammonia of a chelating agent is not used therein, and thus it is not suitable for being used as a positive electrode active material for a lithium secondary battery.

In order to improve this point, in Korea Patent Publication No. 2007-0097923, a positive electrode active material which has an inner bulk portion and an outer bulk portion and a continuous concentration distribution of the metal components depending on the location in the outer bulk portion has been proposed. However, in this method, the concentration is constant in the inner bulk portion and the metal composition is only changed in the outer bulk portion, and thus it is desired to develop a positive electrode active material having a new structure so as to exhibit excellent stability and to have a higher capacity.

In addition, the reversible capacity relatively increases but the thermal stability significantly decreases when the content of Ni is high, and when the content of Ni is relatively low and the content of Mn is high, the thermal stability is improved but the advantage in terms of energy density is eliminated as compared to the existing $LiCoO_2$. Hence, it is desired to have the optimum composition of Ni:Mn:Co and the ratio of Li/M in terms of capacity and safety in order to completely or partly replace the existing $LiCoO_2$.

The control of the ratio of Li/M in the positive electrode active material is associated with the content of Mn in the transition metal composite, and it is possible to insert an excess amount of lithium into the transition metal layer when the amount of Mn substituted is equal to or more than a certain value. In terms of battery characteristics, a relatively high high-rate characteristics and lifespan characteristics are exerted by the excess amount of lithium inserted into the transition metal layer, and it is easy to insert lithium into the transition metal layer in a composition system having a relatively high content of Mn as compared to the ternary system having a low content of Mn, thus it is possible to control the content of water-soluble bases such as $Li_2CO_3$ and LiOH which remain on the surface of the active material after firing by minimizing the amount of lithium added at the time of synthesis. The residual lithium components are decomposed during charge and discharge or react with the electrolytic solution to generate $CO_2$ gas, as a result, the swelling phenomenon of the battery is caused and particularly the high-temperature stability of the battery deteriorates.

In particular, impurities such as LiOH or $Li_2CO_3$ are formed on the surface when a ternary positive electrode active material containing Ni as a main component is exposed to air and moisture (see Reaction Formulas 1 and 2; J. Power Sources, 134, page 293, 2004)

$LiNiO_2 + yH2O \rightarrow Li_{1-y}NiO_{2-y/2} + yLiOH$     Reaction Formula 1:

$LiNi_{0.8}Co_{0.15}Al_{0.05}O_2 + 4xO_2 + yH_2O \rightarrow Li_{1-y}Ni_{0.8}Co_{0.15}Al_{0.05}O_2 + 2xLi_2Co_3$     Reaction Formula 2:

The residual lithium component thus formed raise the pH during the preparation of slurry for plate, the slurry containing NMP (1-methyl-2-pyrrolidinone) and a binder begins to be polymerized to form gel, and thus a problem is caused in the plate producing process. Lithium hydroxide decreases the dispersibility of the positive electrode active material, a binder, a conductive material, and the like in a solvent, and thus it takes a long period of time to stabilize the viscosity of the slurry. In addition, when the slurry is coated on the current collector while the viscosity is not stabilized, it is not uniformly coated on the current collector, the smoothness of the electrode surface decreases, and thus the performance of the battery deteriorates.

Hence, a number of prior arts have focused on improving the characteristics and the producing process of the positive electrode active material containing nickel as a main component in order to decrease the amount of residual lithium.

SUMMARY

Embodiments of the inventive concepts provide a positive electrode active material having a new structure in which the concentration of nickel has a gradient so as to have a high content of nickel and a high capacity and to exhibit improved charge and discharge characteristics and thermal stability.

One aspect of embodiments of the inventive concept is directed to provide a positive electrode active material for lithium secondary battery including: a first concentration gradient portion having gradients of concentrations of nickel, manganese, and cobalt in a direction from a center to a surface; a first concentration maintained portion that is formed on the outside of the first concentration gradient portion and has concentrations of nickel, manganese, and cobalt which are maintained at a terminal of the first concentration gradient portion; and a second concentration gradient portion that is formed on the outside of the first concentration maintained portion and has gradients of concentrations of nickel, manganese, and cobalt in the direction from the center to the surface.

In embodiments of the inventive concept, the fact that the core portion has the gradients of concentrations of nickel, manganese, and cobalt means that the concentrations of nickel, manganese, and cobalt change depending on the distance from the center of the positive electrode active material particle.

In the positive electrode active material according to embodiments of the inventive concept, the core portion has constant magnitudes of concentration gradients of nickel, manganese, and cobalt. According to embodiments of the inventive concept, the magnitudes of concentration gradients of nickel, manganese, and cobalt are constant in the entire core portion, and thus the functional relation between the concentrations of nickel, manganese, and cobalt and the distance from the center may be linear.

In addition, according to embodiments of the inventive concept, the magnitudes of concentration gradients of nickel, manganese, and cobalt may change depending on the distance from the center on the basis of the magnitudes at the center of the positive electrode active material particle in the core portion. In other words, the functional relation between the concentrations of nickel, manganese, and cobalt and the distance from the center may be curved. In other words, the rate of change in concentrations of nickel, manganese, and cobalt at the location having a distance D from the center in the core portion may include a constant, a linear function, or a polynomial function.

In the positive electrode active material according to embodiments of the inventive concept, the first concentration maintained portion is represented by the following Chemical Formula 1.

$Li_{1+a}Ni_{x1}Co_{y1}Mn_{1-x1-y1-d1}O_{2+d1}$     [Chemical Formula 1]

In Chemical Formula 1, $0.6 \le x1 \le 0.8$, $0.05 \le y1 \le 0.2$, $0.1 \le 1-x1-y1-d1 \le 0.25$, $0.01 \le a \le 0.1$, and $0.01 \le d1 \le 0.1$.

The positive electrode active material according to embodiments of the inventive concept may further include a second concentration maintained portion that is formed on the outside of the second concentration gradient portion and has concentrations of nickel, manganese, and cobalt which are maintained.

In the positive electrode active material according to embodiments of the inventive concept, the concentrations of nickel, manganese, and cobalt in the second concentration maintained portion are the same as the concentrations of nickel, manganese, and cobalt at a terminal of the second concentration gradient portion.

In the positive electrode active material according to embodiments of the inventive concept, the concentrations of nickel, manganese, and cobalt in the second concentration maintained portion are discontinuous with respect to the concentrations of nickel, manganese, and cobalt at a terminal of the second concentration gradient portion.

In the positive electrode active material according to embodiments of the inventive concept, the second concentration maintained portion is represented by the following Chemical Formula 2.

$Li_{1+a}Ni_{x2}Co_{y2}Mn_{1-x2-y2-d2}O_{2+d2}$     [Chemical Formula 2]

In Chemical Formula 2, $0.5 \le x2 \le 0.6$, $0.15 \le y2 \le 0.25$, $0.2 \le 1-x2-y2-d2 \le 0.35$, $0.01 \le a \le 0.1$, and $0.01 \le d2 \le 0.1$.

The positive electrode active material according to embodiments of the inventive concept may further include a third concentration maintained portion having constant concentrations of nickel, manganese, and cobalt inside the first concentration gradient portion in a center direction.

In the positive electrode active material according to embodiments of the inventive concept, the third concentration maintained portion is represented by the following Chemical Formula 3.

$Li_{1+a}Ni_{x3}Co_{y3}Mn_{1-x3-y3-d3}O_{2+d3}$     [Chemical Formula 3]

In Chemical Formula 3, $0.7 \le x3 \le 0.9$, $0.15 \le y3 \le 0.25$, $0.2 \le 1-x3-y3-d3 \le 0.35$, $0.01 \le a \le 0.1$, and $0.01 \le d3 \le 0.1$.

In the positive electrode active material according to embodiments of the inventive concept, the first concentration maintained portion has a thickness of from 0.1 μm to 0.6 μm.

In the positive electrode active material according to embodiments of the inventive concept, the second concentration maintained portion has a thickness of from 0.1 μm to 0.6 μm.

In the positive electrode active material according to embodiments of the inventive concept, an effect derived from the formation of the shell portion is not obtained when the thickness of each of the first and second concentration maintained portions is smaller than 0.1 μm, and the overall capacity rather decreases when the thickness is greater than 0.6 μm.

Another aspect of embodiments of the inventive concept is directed to provide a positive electrode active material for lithium secondary battery including: a first concentration gradient portion having gradients of concentrations of nickel, manganese, and cobalt in a direction from a center to a surface; a second concentration gradient portion having gradients of concentrations of nickel, manganese, and cobalt in the direction from the center to the surface; and a first concentration maintained portion that is positioned between the first concentration gradient portion and the second concentration gradient portion and has concentrations of nickel, manganese, and cobalt which are maintained.

In the positive electrode active material according to embodiments of the inventive concept, the concentration of nickel in the first concentration maintained portion may be the same as the minimum value of the concentration of nickel in the first concentration gradient portion.

In the positive electrode active material according to embodiments of the inventive concept, the concentration of nickel in the first concentration maintained portion may be the same as the maximum value of the concentration of nickel in the second concentration gradient portion.

In the positive electrode active material according to embodiments of the inventive concept, the concentration of nickel in the first concentration maintained portion may be different from the maximum value of the concentration of nickel in the first concentration gradient portion or the second concentration gradient portion. In other words, the concentration of nickel in the first concentration maintained portion may be discontinuous with respect to the concentration gradient of nickel in the first concentration gradient portion or the second concentration gradient portion.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF THE EMBODIMENT

Hereinafter, the inventive concept will be described in more detail with reference to Examples. However, the inventive concept is not limited by the following Examples.

EXAMPLES

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.7 L/hr, thereby forming the first concentration gradient portion. In addition, a sodium hydroxide solution having a concentration of 5 mol was supplied into the reactor in order to adjust the pH so that the pH was maintained at 11.5. The speed of impeller was controlled at 400 rpm.

Thereafter, only the second aqueous metal solution was supplied into the reactor for a certain period of time to form the first concentration maintained portion in which the concentrations of nickel, manganese, and cobalt at the outermost part of the first concentration gradient portion are maintained on the outside of the first concentration gradient portion in a thickness of from 0.2 to 1 μm.

Thereafter, a third aqueous metal solution prepared by mixing nickel sulfate, cobalt sulfate, and manganese sulfate so as to have constant concentrations of $Ni_{x3}Co_{y3}Mn_{z3}OH_2$ was supplied into the reactor while mixing them and changing the mixing ratio of the third aqueous metal solution to the second aqueous metal solution, thereby forming the second concentration gradient portion on the outside of the first concentration maintained portion.

Thereafter, only the third aqueous metal solution was supplied into the reactor for a certain period of time to form the second concentration maintained portion on the outside of the second concentration gradient portion.

The concentrations of the aqueous metal solutions in Examples 1 to 4 are as presented in the following Table 1.

TABLE 1

| | First aqueous metal solution | | | Second aqueous metal solution | | | Third aqueous metal solution | | | Thickness of second concentration maintained portion |
|---|---|---|---|---|---|---|---|---|---|---|
| | Ni | Co | Mn | Ni | Co | Mn | Ni | Co | Mn | |
| Example 1 | 95 | 2 | 3 | 80 | 7 | 13 | 54 | 15 | 31 | 0.3 μm |
| Example 2 | 85 | 5 | 10 | 70 | 10 | 20 | 55 | 18 | 27 | 0.5 μm |
| Example 3 | 85 | 3 | 12 | 73 | 10 | 17 | 58 | 14 | 28 | 0.4 μm |
| Example 4 | 80 | 7 | 13 | 69 | 12 | 19 | 57 | 13 | 30 | 0.2 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

COMPARATIVE EXAMPLES

In Comparative Example 1, particles are produced in the same manner as in Example 1 except that a first aqueous metal solution and a second aqueous metal solution were prepared by mixing nickel sulfate, cobalt sulfate, and manganese sulfate so as to have concentration gradients from the center part to the surface part of the entire particle and a composition of $Ni_{85}Co_5Mn_{10}OH_2$ and a composition of $Ni_{57}Co_{16}Mn_{27}OH_2$, respectively, and the first aqueous metal solution and the second aqueous metal solution were mixed while changing the mixing ratio thereof.

In Comparative Example 2, positive electrode active material particles having constant concentrations of nickel, manganese, and cobalt in the entire particle were produced using an aqueous metal solution having a composition of $Ni_{62}Co_{14}Mn_{24}OH_2$ which corresponds to the average composition of the particle in Example 2.

In Comparative Example 3, positive electrode active material particles having constant concentrations of nickel, manganese, and cobalt in the entire particle were produced using an aqueous metal solution having a composition of $Ni_{55}Co_{18}Mn_{27}OH_2$.

<EXPERIMENTAL EXAMPLE> TAKING OF EDX IMAGE

Figure 1:
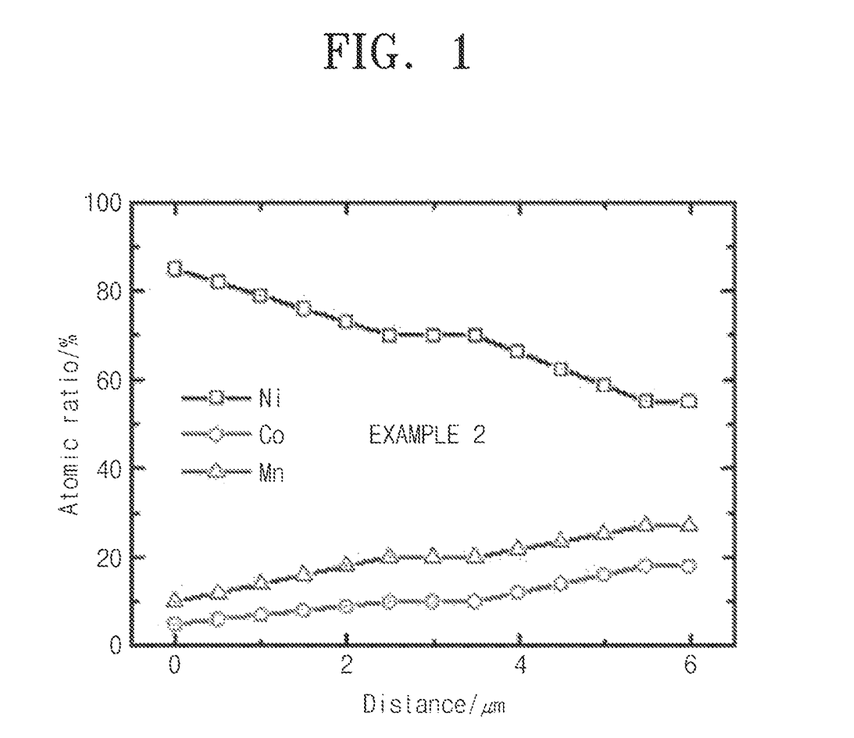
FIG. 1 illustrates the results of concentrations of Ni, Mn, Co depending on the distance from the center in the particles produced in Example of the inventive concept measured by EDX.

The concentrations of Ni, Mn, and Co depending on the distance from the center in the particles produced in Example 2 were measured by EDX, and the results are illustrated in FIG. 1.

In FIG. 1, a particle structure in which the first concentration gradient portion, the concentration maintained portion, and the second concentration gradient portion are formed has been confirmed in the case of the particles according to Example of the inventive concept, and it can be seen that the magnitudes of the concentration gradients in the first concentration gradient portion and the second concentration gradient portion are constant as the functional relations between the first concentration gradient portion and the distance and between the second concentration gradient portion and the distance are linear, respectively.

<EXPERIMENTAL EXAMPLE> MEASUREMENT OF BATTERY CHARACTERISTICS

The charge and discharge characteristics, lifespan characteristics, DSC characteristics, and tap density of the batteries which included the active materials produced in Examples 1 to 4 and Comparative Examples 1 to 3 were measured, and the results are presented in the following Table 2.

TABLE 2

| | Capacity (mAh/g) −2.7 to −4.3 V, 0.1 C | Lifespan characteristics (%) −2.7 to −4.3 V, 0.5 C, 100$^{th}$ cycle | DSC (° C.) −4.3 V cut off | Tap density (g/cc) |
|---|---|---|---|---|
| Example 1 | 199.8 | 95.0 | 281.9 | 2.59 |
| Example 2 | 194.4 | 95.6 | 285.2 | 2.60 |
| Example 3 | 200.7 | 94.8 | 277.8 | 2.58 |
| Example 4 | 196.1 | 95.4 | 283.3 | 2.59 |
| Comparative Example 1 | 193.1 | 95.3 | 284.5 | 2.58 |
| Comparative Example 2 | 183.7 | 90.8 | 268.0 | 2.50 |
| Comparative Example 3 | 178.1 | 95.0 | 286.8 | 2.51 |

Figure 2:
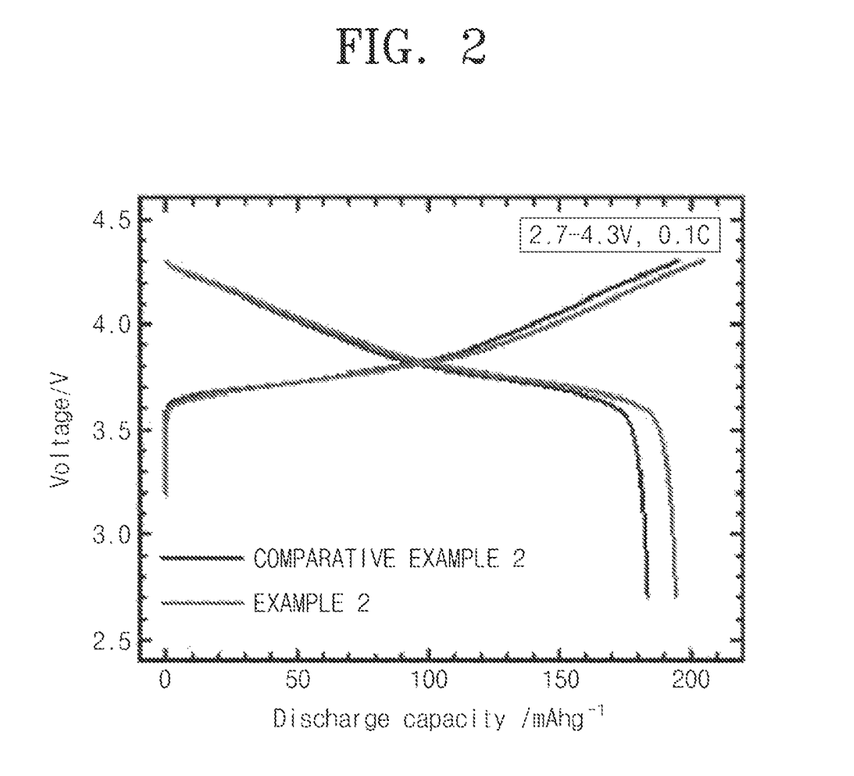
FIGS. 2 to 4 illustrate the results of charge and discharge characteristics, lifespan characteristics, and DSC characteristics measured on the particles produced in Example and Comparative Examples of the inventive concept, respectively.
Figure 3:
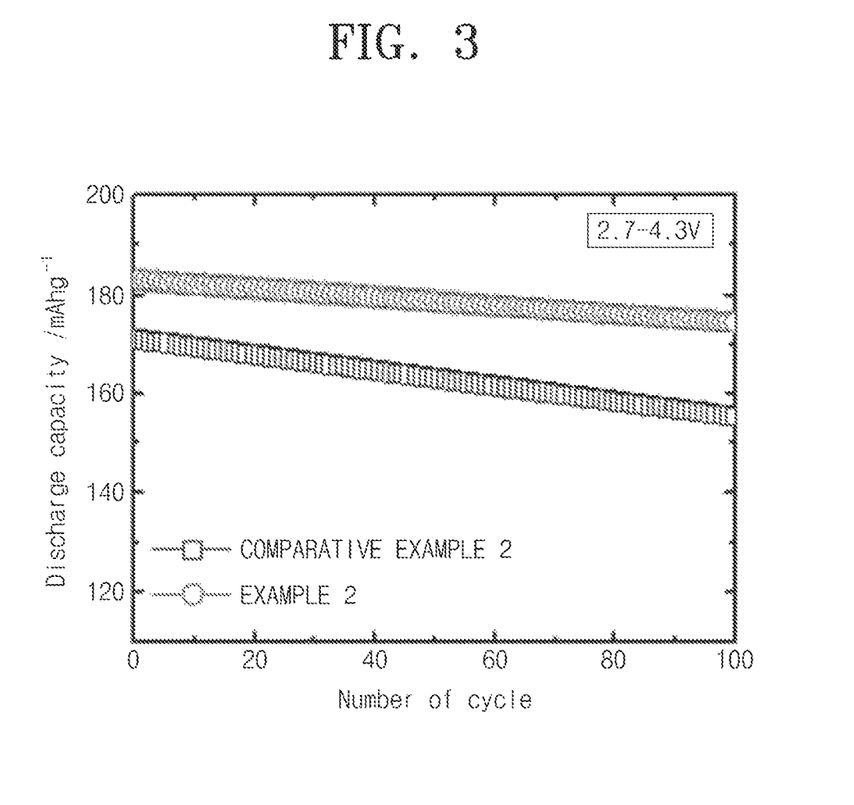
Figure 4:
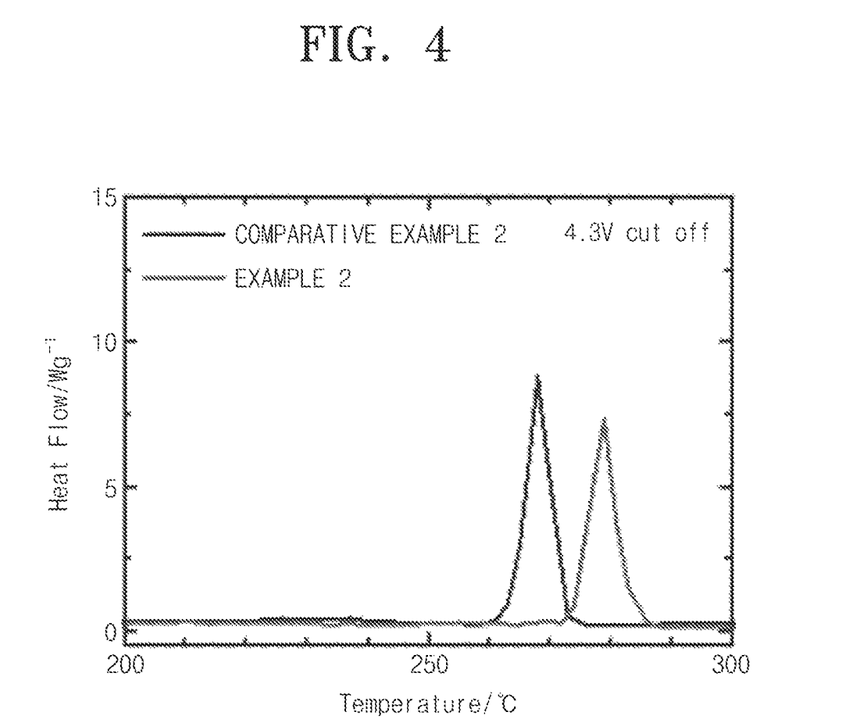

The charge and discharge characteristics, lifespan characteristics, and DSC characteristics of the particles produced in Example 2 and Comparative Example 2 were measured, and the results are illustrated in FIGS. 2 to 4, respectively.

In FIGS. 2 to 4, it has been confirmed that the composition of particles in Comparative Example 2 is the same as the average composition of the particles in Example 2 but the charge and discharge characteristics, lifespan characteristics, and thermal stability are greatly improved in Example 2 as compared to those in Comparative Example 2 since the particles in Example 2 includes the first concentration gradient portion, the first concentration maintained portion, the second concentration gradient portion, and the second concentration maintained portion that is continuous with respect to the second concentration gradient portion.

EXAMPLES

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal solution and a second aqueous metal solution were prepared by mixing nickel sulfate, cobalt sulfate, and manganese sulfate so as to have a composition of $Ni_{x1}Co_{y1}Mn_{z1}OH_2$ (X1, Y1, Z1) and a composition of $Ni_{x2}Co_{y2}Mn_{z2}OH_2$ (x2, y2, z2), respectively, the first aqueous metal solution and the second aqueous metal solution were continuously introduced into the reactor at 0.7 L/hr while mixing them and changing the mixing ratio thereof, and an ammonia solution having a concentration of 25 mol was also continuously introduced into the reactor at 0.7 L/hr, thereby forming the first concentration gradient portion. In addition, a sodium hydroxide solution having a concentration of 5 mol was supplied into the reactor in order to adjust the pH so that the pH was maintained at 11.5. The speed of impeller was controlled at 400 rpm.

Thereafter, only the second aqueous metal solution was supplied into the reactor for a certain period of time to form the first concentration maintained portion in which the concentrations of nickel, manganese, and cobalt of the first concentration gradient portion are maintained on the outside of the first concentration gradient portion in a thickness of from 0.2 to 1 μm.

Thereafter, a third aqueous metal solution prepared by mixing nickel sulfate, cobalt sulfate, and manganese sulfate so as to have constant concentrations of $Ni_{x3}Co_{y3}Mn_{z3}OH_2$ was supplied into the reactor while mixing them and changing the mixing ratio of the third aqueous metal solution to the second aqueous metal solution, thereby forming the second concentration gradient portion on the outside of the first concentration maintained portion.

Thereafter, only a fourth aqueous metal solution prepared by mixing nickel sulfate, cobalt sulfate, and manganese sulfate so as to have constant concentrations of $Ni_{x4}Co_{y4}Mn_{z4}OH_2$ was supplied into the reactor for a certain period of time to form the second concentration maintained portion having discontinuous concentrations of nickel, manganese, and cobalt on the outside of the second concentration gradient portion.

The concentrations of the aqueous metal solutions in Examples 5 to 8 are as presented in the following Table 3.

TABLE 3

| | First aqueous metal solution | | | Second aqueous metal solution | | | Third aqueous metal solution | | | Fourth aqueous metal solution | | | Thickness of second concentration maintained portion |
|---|---|---|---|---|---|---|---|---|---|---|---|---|---|
| | Ni | Co | Mn | Ni | Co | Mn | Ni | Co | Mn | Ni | Co | Mn | |
| Example 5 | 93 | 2 | 5 | 82 | 6 | 12 | 65 | 13 | 22 | 59 | 12 | 29 | 0.3 μm |
| Example 6 | 90 | 3 | 7 | 80 | 6 | 14 | 63 | 11 | 26 | 57 | 13 | 30 | 0.4 μm |
| Example 7 | 85 | 5 | 10 | 73 | 10 | 17 | 61 | 12 | 27 | 55 | 17 | 28 | 0.5 μm |
| Example 8 | 80 | 5 | 10 | 70 | 11 | 19 | 60 | 19 | 21 | 56 | 15 | 29 | 0.2 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

COMPARATIVE EXAMPLES

In Comparative Example 4, positive electrode active material particles having constant concentrations of nickel, manganese, and cobalt in the entire particle were produced using an aqueous metal solution having a composition of $Ni_{65}Co_{12}Mn_{23}OH_2$ which corresponds to the average composition of the entire particle in Example 7.

In Comparative Example 5, positive electrode active material particles having constant concentrations of nickel, manganese, and cobalt in the entire particle were produced using an aqueous metal solution having a composition of $Ni_{65}Co_{12}Mn_{23}OH_2$ which corresponds to the composition of the second concentration gradient portion in Example 7.

<EXPERIMENTAL EXAMPLE> TAKING OF EDX IMAGE

Figure 5:
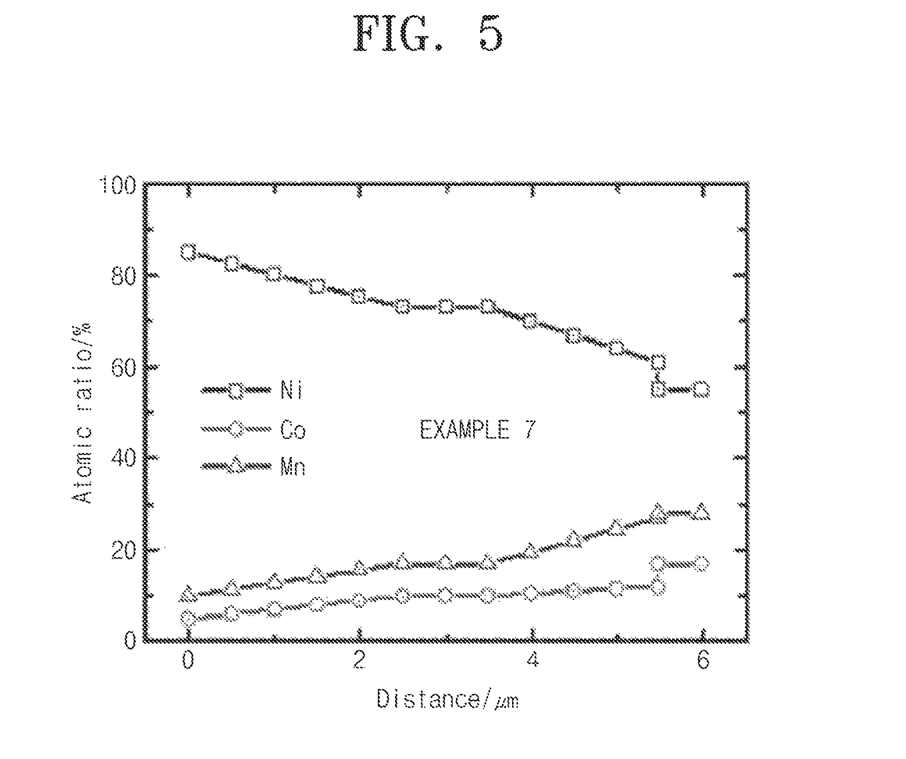
FIG. 5 illustrates the results of concentrations of Ni, Mn, Co depending on the distance from the center in the particles produced in Example of the inventive concept measured by EDX.

The concentrations of Ni, Mn, and Co depending on the distance from the center in the particles produced in Example 7 were measured by EDX, and the results are illustrated in FIG. 5.

In FIG. 5, it has been confirmed that the first concentration gradient portion, the first concentration maintained portion, the second concentration gradient portion, and the second concentration maintained portion that is discontinuous with respect to the second concentration gradient portion are formed in the case of the particles according to Example of the inventive concept.

In addition, it can be seen that the magnitudes of the concentration gradients in the first concentration gradient portion and the second concentration gradient portion are constant since the functions of concentration according to distance in the first and second concentration gradient portions are linear.

<EXPERIMENTAL EXAMPLE>
MEASUREMENT OF CHARGE AND DISCHARGE CHARACTERISTICS, LIFESPAN CHARACTERISTICS, AND DSC

The charge and discharge characteristics, lifespan characteristics, DSC characteristics, and tap density of the batteries which included the active materials produced in Examples 5 to 7 and Comparative Examples 4 and 5 were measured, and the results are presented in the following Table 4.

TABLE 4

| | Capacity (mAh/g) −2.7 to −4.3 V, 0.1 C | Lifespan characteristics (%) −2.7 to −4.3 V, 0.5 C, $100^{th}$ cycle | DSC (° C.) −4.3 V cut off | Tap density (g/cc) |
|---|---|---|---|---|
| Example 5 | 205.9 | 94.7 | 275.9 | 2.58 |
| Example 6 | 203.3 | 94.9 | 278.8 | 2.59 |
| Example 7 | 200.2 | 95.3 | 280.5 | 2.60 |
| Example 8 | 197.5 | 95.6 | 284.2 | 2.59 |
| Comparative Example 4 | 187.6 | 90.1 | 263.3 | 2.50 |
| Comparative Example 5 | 178.8 | 95.1 | 287.1 | 2.49 |

Figure 6:
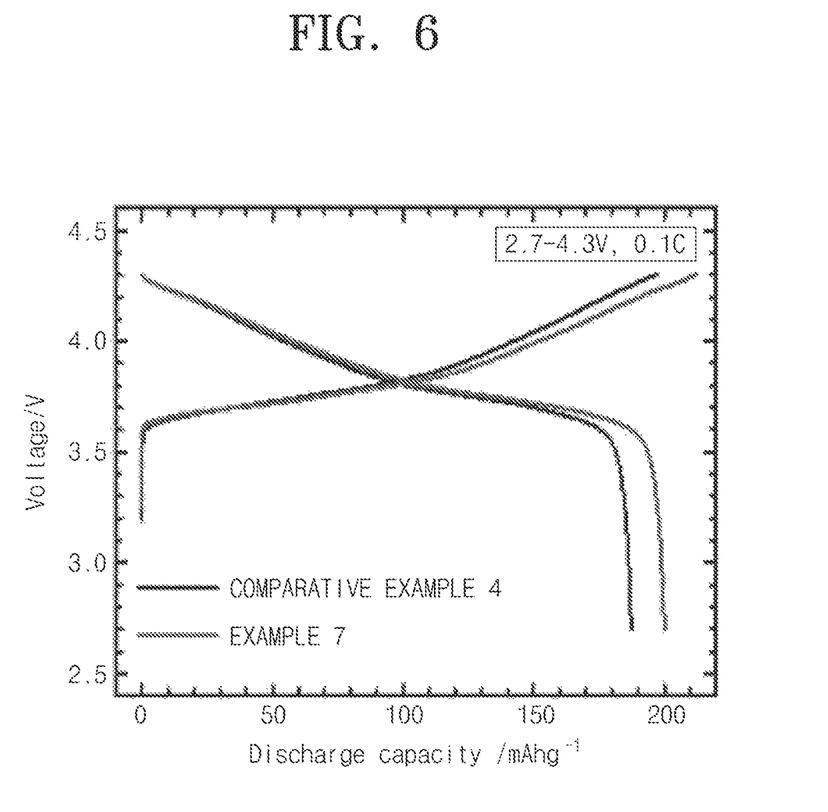
FIGS. 6 to 8 illustrate the results of charge and discharge characteristics, lifespan characteristics, and DSC characteristics measured on the particles produced in Example and Comparative Examples of the inventive concept, respectively.
Figure 7:
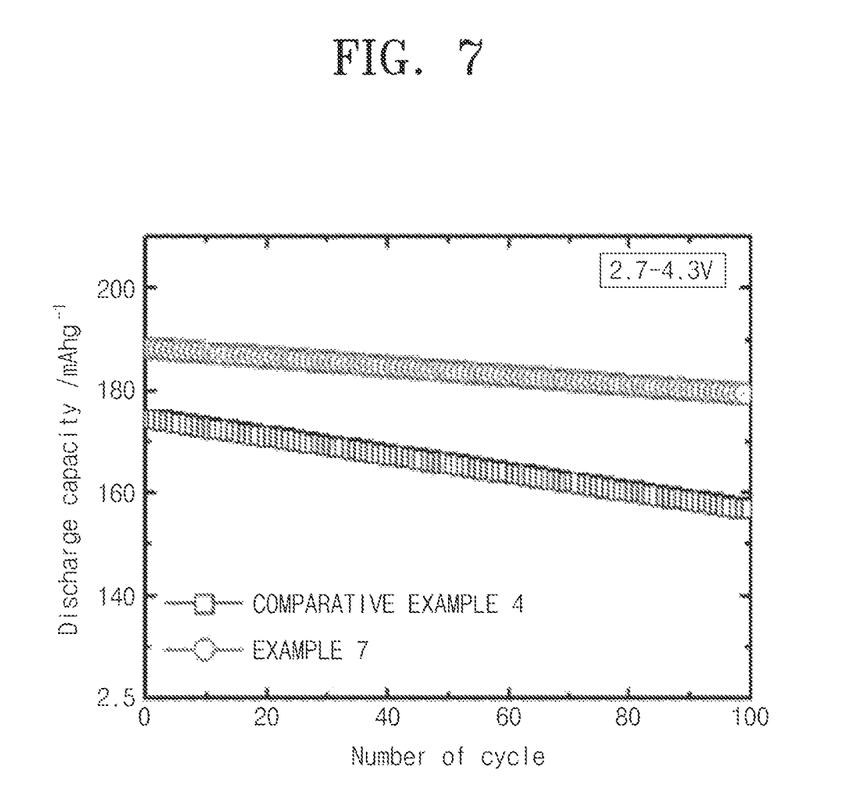
Figure 8:
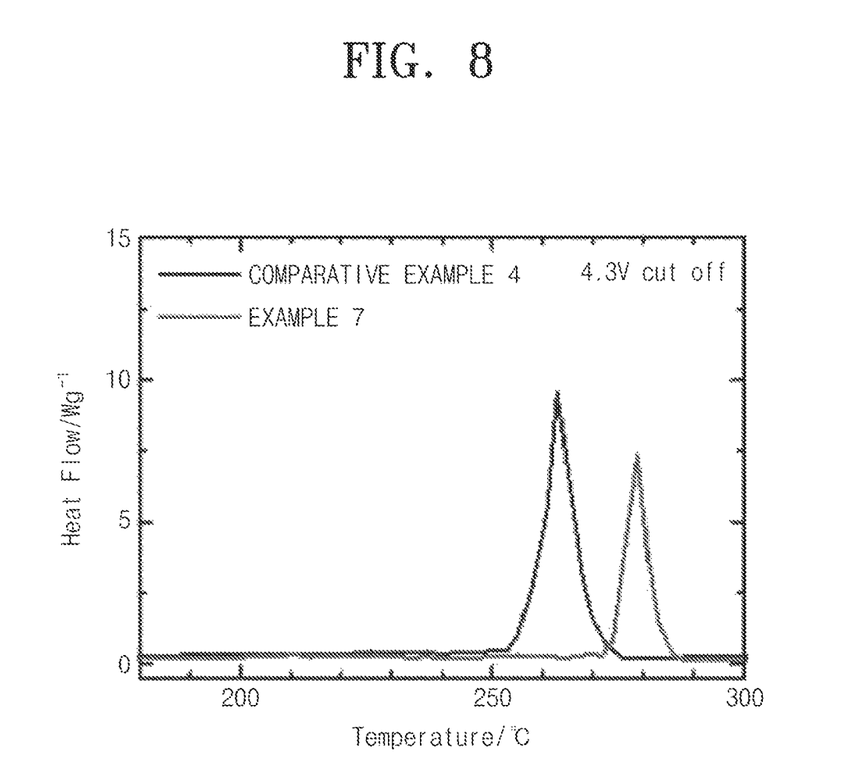

The charge and discharge characteristics, lifespan characteristics, and DSC characteristics of the particles produced in Example 7 and Comparative Example 4 were measured, and the results are illustrated in FIGS. 6 to 8, respectively.

In FIGS. 6 to 8, it has been confirmed that the composition of particles in Comparative Example 4 is the same as the average composition of the particles in Example 7 but the charge and discharge characteristics, lifespan characteristics, and thermal stability are greatly improved in Example 7 as compared to those in Comparative Example 4 since the particles in Example 7 includes the first concentration gradient portion, the first concentration maintained portion, the second concentration gradient portion, and the second concentration maintained portion.

The positive electrode active material according to embodiments of the inventive concept includes the first concentration maintained portion between the first concentration gradient portion and the second concentration gradient portion which have concentration gradients of nickel, manganese, and cobalt and the second concentration maintained portion on the outside of the second concentration gradient portion, thus the content of Ni contained in the particle is high so that the capacity is high, the crystal structure is stabilized by the concentration gradient so that excellent lifespan characteristics and charge and discharge characteristics are exhibited, and the positive electrode active material is structurally stabilized even when being used at a high voltage.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A positive electrode active material for lithium secondary battery, the positive electrode active material comprising a plurality of particles, each particle comprising:
a first concentration gradient portion having gradients of concentrations of nickel, manganese, and cobalt in a direction from a center of the particle to a surface of the particle, wherein the center of the particle is included in the first concentration gradient portion;
a first concentration maintained portion that is formed on the outside of the first concentration gradient portion and has concentrations of nickel, manganese, and cobalt which are maintained at a terminal of the first concentration gradient portion; and
a second concentration gradient portion that is formed on the outside of the first concentration maintained portion and has gradients of concentrations of nickel, manganese, and cobalt in the direction from the center of the particle to the surface of the particle,
wherein an average concentration of nickel in the first concentration gradient portion is higher than an average concentration of nickel in the first concentration maintained portion, and the average concentration of nickel in the first concentration maintained portion is higher than an average concentration of nickel in the second concentration gradient portion,
wherein an average concentration of cobalt and an average concentration of manganese in the first concentration gradient portion are lower than an average concentration of cobalt and an average concentration of manganese in the first concentration maintained portion, respectively, and the average concentration of cobalt and the average concentration of manganese in the first concentration maintained portion are lower than an average concentration of cobalt and an average concentration of manganese in the second concentration gradient portion, respectively, and
wherein the average concentration of nickel is higher than the average concentration of cobalt and the average concentration of manganese in the first concentration gradient portion.

2. The positive electrode active material of claim 1, wherein the first concentration maintained portion is represented by the following Chemical Formula 1:

wherein, in the chemical Formula 1, $0.6 \leq x1 \leq 0.8$, $0.05 \leq y1 \leq 0.0.2$, $0.1 \leq 1-x1-y1-d1 \leq 0.25$, $0.01 \leq a \leq 0.1$, and $0.01 \leq d1 \leq 0.1$.

3. The positive electrode active material of claim 1, wherein the first concentration maintained portion has a thickness of from 0.1 μm to 0.6 μm.

4. The positive electrode active material of claim 1, further comprising: a second concentration maintained portion that is formed on the outside of the second concentration gradient portion and has concentrations of nickel, manganese, and cobalt which are maintained.

5. The positive electrode active material of claim 4, wherein the concentrations of nickel, manganese, and cobalt in the second concentration maintained portion are the same as the concentrations of nickel, manganese, and cobalt at a terminal of the second concentration gradient portion.

6. The positive electrode active material of claim 4, wherein the concentrations of nickel, manganese, and cobalt in the second concentration maintained portion are discontinuous with respect to the concentrations of nickel, manganese, and cobalt of a terminal of the second concentration gradient portion.

7. The positive electrode active material of claim 4, wherein the second concentration maintained portion has a thickness of from 0.1 μm to 0.6 μm.

8. The positive electrode active material of claim 4, wherein the second concentration maintained portion is represented by the following Chemical Formula 2:

wherein, in the chemical Formula 2, $0.5 \leq x2 \leq 0.6$, $0.15 \leq y2 \leq 0.0.25$, $0.2 \leq 1-x2-y2-d2 \leq 0.35$, $0.01 \leq a \leq 0.1$, and $0.01 \leq d2 \leq 0.1$.

* * * * *